United States Patent [19]
Miller, Sr. et al.

[11] Patent Number: 5,423,309
[45] Date of Patent: Jun. 13, 1995

[54] OVEN ATTACHMENT FOR A CAMPING LANTERN

[76] Inventors: Rockford M. Miller, Sr., 1202 Aspen Dr., Porter County, Valparaiso, Ind. 46383; Timothy S. Mannen, 588 E. 900 N, Porter County, Westville, Ind. 46391

[21] Appl. No.: 303,410

[22] Filed: Sep. 9, 1994

[51] Int. Cl.6 .............................. F24C 5/04
[52] U.S. Cl. ........................ 126/260; 126/256; 126/47; 126/275 R
[58] Field of Search ............... 126/47, 48, 275 R, 260, 126/256

[56] References Cited

U.S. PATENT DOCUMENTS

| | | | |
|---|---|---|---|
| 65,286 | 5/1867 | Schartan | 126/47 |
| 136,104 | 2/1873 | Silber et al. | 126/47 |
| 559,153 | 4/1896 | Upton | 126/47 |
| 1,772,272 | 8/1930 | Tongue, Sr. | 362/180 |
| 3,408,998 | 11/1968 | Brancato et al. | 126/4 |
| 4,029,079 | 6/1977 | Elder | 126/258 |

Primary Examiner—Carroll B. Dority
Attorney, Agent, or Firm—Gary M. Hartman; Domenica N. S. Hartman

[57] ABSTRACT

An oven attachment is provided for a camping lantern, in which the oven attachment is configured to be attached to the lantern so as to form an integral component of the lantern. In particular, the oven attachment provides an enclosure in which foods and beverage containers can be placed and uniformly heated with the heat generated by a conventional camping lantern. The versatility of the oven attachment is enhanced by the ability to regulate the temperature of the enclosure with a damper assembly. Yet the oven attachment is constructed such that its use and structure does not interfere with the safe operation of the lantern as intended by the manufacturer, nor does the oven attachment significantly diminish the lighting capability of the lantern.

20 Claims, 2 Drawing Sheets

OVEN ATTACHMENT FOR A CAMPING LANTERN

BACKGROUND OF THE INVENTION

1. Field of the Invention

The present invention generally relates to camping lanterns. More particularly, this invention relates to an attachment for such a lantern, in which the attachment forms a fully-enclosed oven whose temperature can be regulated, and in which the attachment is adapted to form an integral part of the lantern such that the lighting capability and safety features of the lantern are retained.

2. Description of the Prior Art

Various devices in the prior art have been suggested which provide a portable cooking device, often using kerosene as the fuel. Many of these devices, such as that taught by U.S. Pat. No. 136,104 to Silber et al., provide a stove which enables cookware to be supported over the flame, resulting in the flame being eliminated as a source of light. A similar result is taught by U.S. Pat. No. 559,153 to Upton, in which the glass chimney of a relatively conventional lantern is replaced with a metal chimney whose top surface forms a stove. In contrast, U.S. Pat. No. 1,772,272 to Tongue teaches a generally conventional hurricane lamp having a glass chimney which is adapted to support a cup. As a result, the contents of the cup can be heated by the flame, yet the flame can be fully utilized as a light source. A similar variation is to form a heating compartment which can be supported by the glass chimney of a hurricane lamp, as taught by U.S. Pat. No. 65,286 to Schartan.

More modern variations of the above have been adapted for camping lanterns, such that the cooking device is better suited for outdoor use. Such approaches have suggested substituting a cooking adapter for the lantern's upper portion or roof which protects the lantern's glass chimney from rain and debris, such that the glass chimney remains in place in order to gain full benefit of the lantern's lighting capability. For example, U.S. Pat. No. 3,408,998 to Brancato et al. teach an attachment which completely replaces the lantern's roof with a cooking adapter on which cookware can be placed. Slots are provided in the top surface of the cooking adapter to allow the hot combustion gases to rise past the cookware, in order to promote heating of the cookware. A further variation of this approach is taught by U.S. Pat. No. 4,029,079 to Elder, in which a shield is included to protect the cookware from winds and drafts. The device includes a grate supported above the flame and having an extension to which the shield is mounted.

The above modified camping lanterns have an advantage over the earlier devices by their utilization of the heat generated by a kerosene lamp without interfering with the lantern's ability to provide illumination. However, the lanterns are limited to providing a stove surface on which cookware can be placed, which is not suitable for uniformly heating many types of foods that are better suited for heating in a temperature-controlled oven. Furthermore, these lanterns eliminate the roof of the lantern, enabling rain, water and debris to enter the glass chimney, and therefore pose a safety hazard.

Thus, it would be desirable to provide an improved heating attachment which can be readily assembled to a camping lantern and which does not interfere with the lighting capability of the lantern, while being fully compatible with the safe operation of the lantern as intended by its manufacturer.

SUMMARY OF THE INVENTION

It is an object of this invention to provide an oven attachment for a lantern, in which the oven attachment becomes an integral part of the lantern.

It is a further object of this invention that such an oven attachment not interfere with the lantern's operational safety, nor significantly diminish the lighting capability of the lantern.

It is another object of this invention that such an oven attachment form an enclosure in which food can be placed, so as to enable more uniform heating of the food.

It is yet another object of this invention that the heat directed through the oven attachment be regulated in order to achieve a suitable cooking temperature within the enclosure for a particular food being heated.

It is yet a further object of this invention that the oven attachment be adaptable for use with heat sources other than a lantern.

In accordance with a preferred embodiment of this invention, these and other objects and advantages are accomplished as follows.

According to the present invention, there is provided an oven attachment for a camping lantern, in which the oven attachment is configured to be attached to the camping lantern so as to form an integral component of the lantern. In particular, the oven attachment provides an enclosure in which foods and beverage containers can be placed and uniformly heated with the heat generated by a conventional camping lantern. The versatility of the oven attachment is enhanced by the ability to regulate the temperature of the enclosure. Yet the oven attachment is constructed such that its use and structure does not interfere with the safe operation of the lantern as intended by the manufacturer, nor does the oven attachment significantly reduce the lighting capability of the lantern.

The oven attachment generally includes a housing which forms an oven compartment, a support structure for securing the housing to a lantern, a damper assembly for regulating the flow of hot gases through the oven compartment, a closable opening to the oven compartment, and a fastening device with which the original roof of the lantern can be secured over the housing. The opening to the oven compartment utilizes a closure member rotatably received in the housing, so as to permit access to the oven compartment. The damper assembly is disposed at a lower end of the oven compartment, and is composed of a first damper member which overlays a second damper member. Each of the damper members has a number of holes formed therein, such that the amount of hot gases entering the oven compartment can be regulated by the degree to which the holes in the first damper member are aligned with the holes in the second damper member.

In a preferred embodiment, the oven attachment's support structure includes members which extend downwardly from the housing toward the base of the lantern. Each member terminates with a distal end spaced apart from the housing, to which an attachment member is secured. The attachment member is adapted to engage a portion of the camping lantern below the lantern's glass chimney so as to secure the oven attachment to the lantern. Alternatively, the support structure can be formed at the lower end of the housing for engaging a portion of the camping lantern.

The oven attachment is constructed such that heat in the form of hot combustion gases from the camping lantern's flame is able to enter the oven compartment through the holes in the first and second damper members. The temperature of the oven compartment can be regulated with the damper system in order to suit the particular type of food or food container to be heated. In addition to such advantages, the oven attachment is able to function without significantly interfering with the lantern's ability to provide lighting as intended. The oven attachment also does not adversely effect the operational safety of the lantern, in that it is structured to form an integral component of the lantern between the lantern's roof and chimney. Specifically, the original roof with which the lantern is provided can be used as the roof over the oven attachment, such that the structural and operational integrity of the lantern remains intact. Consequently, another significant advantage is that installation of the oven attachment has minimal effect on the overall aesthetic appearance of the lantern.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

Figure 1:
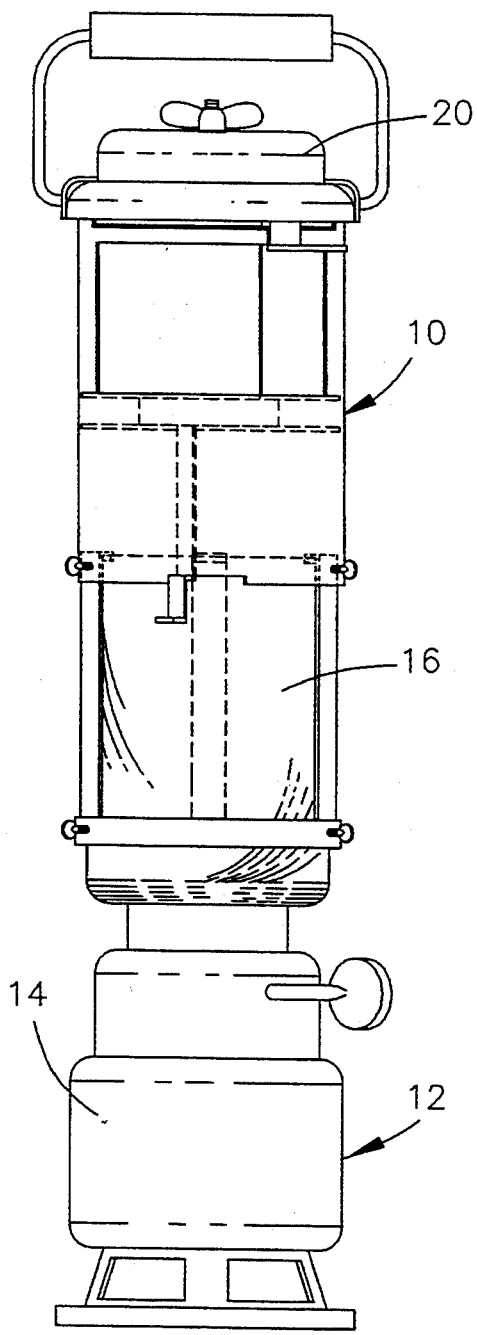
FIG. 1 shows an oven attachment mounted to a camping lantern so as to form a unitary camping lantern and oven in accordance with this invention.

FIG. 1 illustrates an oven attachment 10 which is installed on a camping lantern 12 in accordance with this invention. As shown, the lantern 12 is a generally conventional camping lantern, such as the Model No. 295-700 camping lantern produced by the Coleman Company, Inc. However, it is within the scope of this invention that other types of lanterns or heating sources could be used instead of the camping lantern depicted. As is generally conventional, the lantern 12 includes a base 14 which houses a reservoir of fuel, such as white gasoline, and a glass chimney 16 which houses the lantern's mantels. The lantern 12 is preferably of the type which includes a removable roof 20 which, as illustrated, is attached to the upper end of the oven attachment 10. As such, the oven attachment 10 of this invention functionally and aesthetically forms an integral member of the camping lantern 12. The individual components of the oven attachment 10 are preferably formed from a steel material, though it is foreseeable that other suitable materials could be used.

Figure 3:
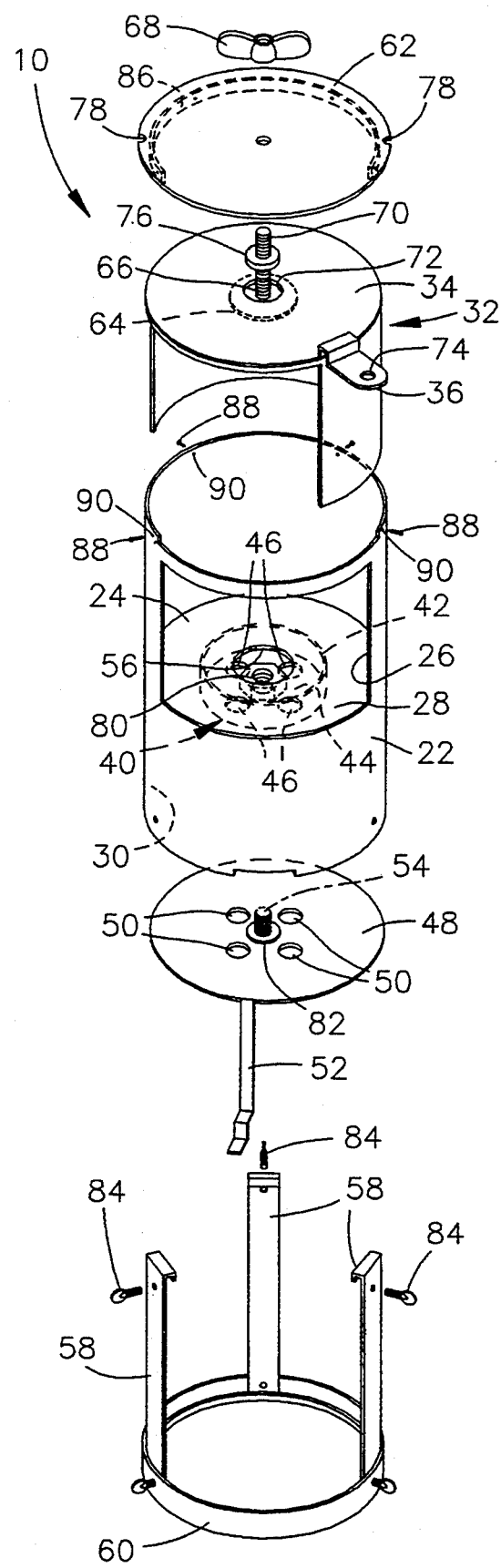
FIG. 3 is an exploded view of the oven attachment of FIG. 2.
Figure 2:
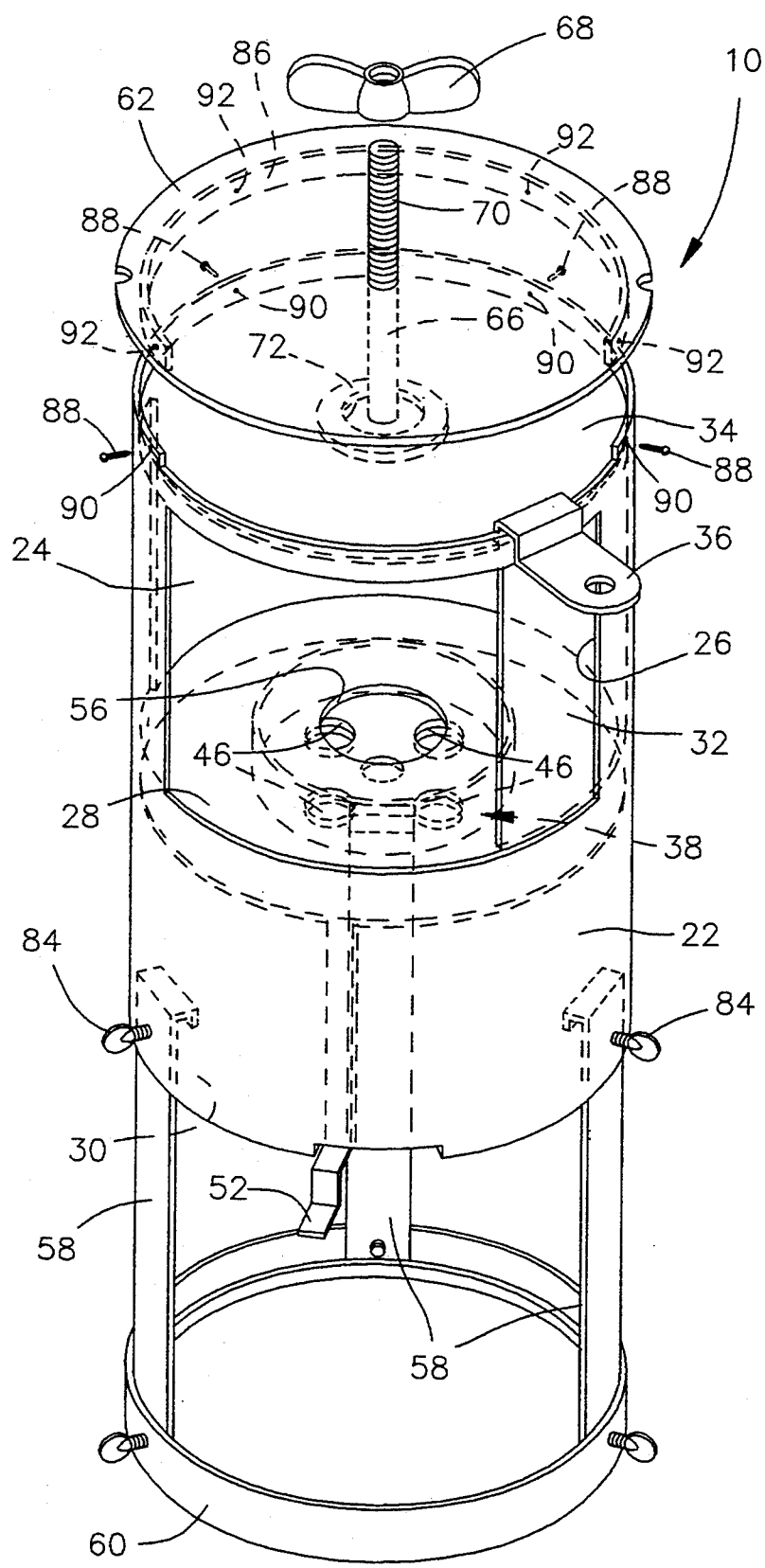
FIG. 2 shows in perspective the oven attachment of FIG. 1 in accordance with a preferred embodiment of this invention.

As more clearly illustrated in FIGS. 2 and 3, the oven attachment 10 includes a cylindrical housing 22 which forms an oven compartment 24. The cylindrical shape of the housing 22 generally defines a central axis of the oven attachment 10. A peripheral opening 26 is formed in the side of the housing 22 to permit access to the oven compartment 24. Within the oven compartment 24 is a floor 28 which is preferably attached to the wall of the housing 22. The floor 28 includes a central opening 56 through which hot gases are able to enter the oven compartment 24 from the lantern 12. The central opening 56 also allows for access to a damper assembly 38, to be described below. The housing 22 extends below the floor 28 so as to form a duct 30 which directs the hot gases into the oven compartment 24.

A cylindrical closure member 32 nests within the housing 22 as shown so as to be rotatable relative to the housing 22, preferably about the central axis defined by the housing 22. Rotation of the closure member 32 selectively permits access to the oven compartment 24 through the peripheral opening 26 in the housing 22, or closure of the peripheral opening 26 so as to enclose the oven compartment 24. The closure member 32 preferably has a closed upper end 34 which forms the ceiling of the oven compartment 24. Extending from the upper end 34 of the closure member 32 is a lever 36 by which the closure member 32 can be rotated within the housing 22. A hole 74 is preferably formed in the lever 36 to lower the temperature of the lever 36 during operation of the lantern 12.

As best seen in FIG. 2, an upper plate 62 is secured with set screws 88 to the upper end of the oven attachment 10. The set screws 88 are threaded through holes 90 in the upper end of the housing 22 and engage corresponding holes 92 formed in a rim 86 which extends downwardly from the lower surface of the upper plate 62 and nests within the housing 22. The rim 86 extends along a limited portion of the circumference of the upper plate 62 so as not to interfere with the operation of the closure member 32, which is rotatably attached to the upper plate 62 with a bolt 66 inserted through a washer 64 and an opening 72 in the upper end 34 of the closure member 32. As such, the upper plate 62 suspends the closure member 32 above the floor 28 of the oven compartment 24, to enable the closure member 32 to rotate more freely within the housing 22. Rotation of the closure member 32 is further eased by a washer 76 positioned between the upper end 34 of the closure member 32 and the upper plate 62, such that there is an axial space between the lower surface of the upper plate 62 and the upper surface of the closure member 32. The upper end 70 of the fastener 66 is threaded to receive a suitable nut 68, such that the original roof 20 of the lantern 12 can be secured to the upper end of the oven attachment 10. Notches 78 are preferably formed in the upper plate 62 to accommodate the ends of the lantern's handle.

The damper assembly 38 is disposed beneath the floor 28 of the oven compartment 24. The damper assembly 38 includes an upper damper member 40 which overlays a lower damper member 48. The upper damper member 40 is generally cup-shaped, having an annular rim 42 extending axially from a disk-shaped base 44. The rim 42 is preferably spot welded to the lower surface of the floor 28, such that upper damper member 40 forms a cavity with the lower surface of the floor 28. A number of holes 46 are formed in the base 44 to permit hot combustion gases from the lantern 12 to pass through the upper damper member 40.

The lower damper member 48 is generally disk-shaped, and is also provided with a number of holes 50 to permit heat from the lantern 12 to pass through the lower damper member 48. As such, hot gases from the lantern 12 are able to flow into the oven compartment 24 through the holes 46 and 50 in the damper assembly 38 and through the central opening 56 in the floor 28 of the oven compartment 24. Thereafter, the gases are able to escape from the oven compartment 24 through gaps between the closure member 32 and the opening 26 in the housing 22, as well as between the closure member 32 and the housing 22.

A handle 52 projecting from the lower damper member 48 allows the lower damper member 48 to be rotated about the central axis of the housing 22 and relative to the upper damper member 40, such that the amount of hot gases permitted to enter the oven compartment 24 can be regulated by the degree to which the holes 46 in the upper damper member 40 are aligned with the holes 50 in the lower damper member 48. As shown in FIG. 3, a fastener 54, provided on the lantern's mantel for securing the roof 20 to the lantern 12, is used to secure the upper and lower damper members 40 and 48 together. To promote the ease with which the lower damper member 48 can be rotated, the lower damper 48 is preferably equipped with a washer 82 nested in a central hole formed in the lower damper 48. The washer 82 is thicker than the thickness of the lower damper member 48, such that the upper and lower damper members 40 and 48 will be axially spaced apart when assembled with the fastener 54. A nut 80 holds the damper assembly 38 together. For assembly and disassembly, access with the nut 80 to the threaded end of the fastener 54 is possible through the central opening 56 in the floor 28, as shown.

While the above is a suitable technique for assembling the damper assembly 38, various other techniques could be used to assemble and secure the damper assembly 38 to the floor 28, such as by securing the entire damper assembly 38 to the floor 28 with a fastener, or by supporting the lower damper member 48 beneath the upper damper member 40 with supports provided on the inner surface of the housing 22.

Support members 58 extend downwardly from the housing 22 as shown, to support an annular attachment member 60. The upper ends of the support members 58 are secured to the housing 22 with set screws 84, allowing the support members 58 to be readily removed if not required for a particular type of lantern, or to allow the oven attachment 10 to be used with an alternative heat source. For example, the set screws 84 could be used to secure the lower end of the housing 22 directly to a suitable section on a lantern configured differently from that shown in FIG. 1. In the preferred embodiment, the upper ends of the support members 58 are formed to engage the upper edge of the chimney 16 in order to assist in securing the chimney 16 in place on the lantern 12. The attachment member 60 is sized and adapted to be secured to a lower portion of the camping lantern 12, as shown in FIG. 1. Using suitable set screws or other suitable fasteners, the oven attachment 10 of this invention can be secured to the camping lantern 12 and thereby form an integral lantern and oven assembly.

The installation and use of the oven attachment 10 is as follows. To install the oven attachment 10, the roof 20 of the camping lantern 12 is removed. With the lantern's glass chimney 16 in place, the oven attachment 10 is positioned over the chimney 16 such that the fastener 54 projects through the lower damper member 48, its washer 82, and the upper damper member 40, and such that the attachment member 60 abuts a lower portion of the lantern 12, at which point the attachment member 60 is secured to the lantern 12. The nut 80 is then threaded onto the fastener 54 through the central opening 56 in the floor 28 of the oven compartment 24. The roof 20 is then secured to the upper end of the oven attachment 10 with the nut 68 and the fastener 66 which projects from the closure member 32 and through the upper plate 62.

In use, the closure member 32 is opened to permit access to the oven compartment 24, and closed to optimize the heating effect which the hot combustion gases from the lantern 12 will have on the oven compartment 24. The temperature at which the oven compartment 24 will stabilize can be readily adjusted by rotating the lower damper member 48 in order to alter the degree to which the holes 50 in the lower damper member 48 are aligned with the holes 46 in the upper damper member 40. If the holes 46 and 50 are not aligned, the hot gases are able to escape through gaps between the chimney 16 and the housing 22.

Because the diameter of the oven compartment 24 is generally equal to that of the chimney 16, relatively large food containers and packages can be received within the oven compartment 24. For example, sandwiches, soup cans, coffee cups and bowls will readily fit within the oven compartment 24, making the oven attachment 10 of this invention useful for warming snacks and prepared lunches while camping, ice fishing, or hunting, etc.

From the above, it can be seen that the oven attachment 10 of this invention is constructed such that the oven compartment 24 will be quickly and uniformly heated by the hot combustion gases from the camping lantern's flame. In addition, the temperature of the oven compartment 24 can be readily adjusted with the damper system 38 in order to suit the particular type of food or food container being heated.

Another advantage of this invention is that the oven attachment 10 is able to function without significantly interfering with the lantern's ability to provide lighting as intended. The primary effect of the oven attachment 10 is to utilize the heat generated by the lantern 12 which would otherwise be lost. Accordingly, the lantern and oven assembly can be used solely as a lantern for emitting light when so desired. Yet, whenever the lantern 12 is operated, the oven compartment 24 will be warmed and therefore ready for use. As such, a lantern equipped with the oven attachment 10 of this invention is ideal for nighttime outdoor activities, such as ice fishing, in which a light source is necessary and a quickly warmed snack can be indispensable.

Finally, an important feature of the oven attachment 10 is that it does not adversely effect the operational safety of the lantern 12 to which it is attached. Specifically, the oven attachment 10 is structured to form an integral component of the lantern 12 between the lantern's roof 20 and chimney 16, such that the structural and operational integrity of the lantern 12 remains intact. Consequently, another advantage of this invention is that the installation of the oven attachment 10 has minimal effect on the overall aesthetic appearance of the lantern 12.

While our invention has been described in terms of a preferred embodiment, it is apparent that other forms could be adopted by one skilled in the art. For example, modifications to the individual components could be made, the manner in which the components are arranged and assembled could be altered and yet achieve the desirable operation of this invention, and various different materials could be employed other than that noted. Accordingly, the scope of our invention is to be limited only by the following claims.

The embodiments of the invention in which an exclusive property or privilege is claimed are defined as follows:

1. An oven attachment for a camping lantern, in which the oven attachment is configured to be attached to the camping lantern so as to form an integral member of the camping lantern and thereby form a camping lantern and oven assembly, the oven attachment comprising:

a housing forming an oven compartment, the housing having a peripheral opening formed therein;

means disposed at an upper portion of the housing for securing an upper cover to the housing;

a closure member rotatably received in the housing, the closure member being operable to selectively permit access to the oven compartment through the peripheral opening in the housing, and to selectively close the peripheral opening so as to enclose the oven compartment;

a damper assembly disposed at a lower end of the oven compartment, the damper assembly comprising a first damper member overlaying a second damper member, each of the first and second damper members having at least one hole formed therein, wherein the flow of hot gases from the camping lantern into the oven compartment is regulated by the degree to which the hole in the first damper member is aligned with the hole in the second damper member; and means at a lower end of the housing for engaging a portion of the camping lantern so as to secure the oven attachment to the camping lantern and thereby form the camping lantern and oven assembly;

whereby heat from the camping lantern enters the oven compartment through the hole in the first and second damper members.

2. An oven attachment as recited in claim 1 wherein the housing has substantially a cylindrical shape which defines a central axis of the oven attachment.

3. An oven attachment as recited in claim 2 wherein the closure member has substantially a cylindrical shape and wherein the closure member nests within the housing.

4. An oven attachment as recited in claim 1 wherein the closure member has an axis of rotation which substantially coincides with the central axis defined by the housing.

5. An oven attachment as recited in claim 1 wherein the closure member forms a ceiling member for the oven compartment.

6. An oven attachment as recited in claim 1 wherein the housing has a lower portion which forms a duct for directing heat through the holes in the first and second damper members and into the oven compartment.

7. An oven attachment as recited in claim 1 further comprising a floor member disposed in the housing so as to form a floor for the oven compartment, the floor member having a central opening formed therein, and wherein the damper assembly is disposed beneath the floor member.

8. An oven attachment as recited in claim 1 wherein the second damper member is rotatable about the central axis of the housing.

9. An oven attachment as recited in claim 1 wherein the second damper member has a handle extending therefrom for rotating the second damper member relative to the first damper member and about the central axis of the housing.

10. An oven attachment as recited in claim 1 wherein the securing means comprises a centrally-disposed fastener projecting from the closure member.

11. An oven attachment for a camping lantern having a removable roof, in which the oven attachment is configured to be secured between the removable roof and the remainder of the camping lantern so as to form an integral member of the camping lantern and thereby form a camping lantern and oven assembly, the oven attachment comprising:

a cylindrical housing forming an oven compartment, the housing having a peripheral opening formed therein, the housing defining a central axis of the oven attachment;

a floor member disposed in the housing so as to form a floor of the oven compartment, the floor member having a central opening formed therein;

means disposed at an upper portion of the housing for securing the removable roof to the housing;

a cylindrical closure member received in the housing, the closure member having an axis of rotation which substantially coincides with the central axis defined by the housing, the closure member being rotatable so as to selectively permit access to the oven compartment through the peripheral opening in the housing, and to selectively close the peripheral opening so as to enclose the oven compartment, the closure member forming a ceiling for the oven compartment;

a damper assembly disposed beneath the floor member so as to form a cavity therebetween, the damper assembly comprising a first damper member overlaying a second damper member, the first damper member comprising a disk-shaped base having a plurality of holes formed therein, the second damper member being disk-shaped and also having a plurality of holes formed therein, wherein the flow of hot gases from the camping lantern into the oven compartment is regulated by the degree to which the plurality of holes in the first damper member are aligned with the plurality of holes in the second damper member;

support members extending downwardly from the housing, each of the support members terminating with a distal end spaced apart from the housing; and an attachment member secured to each of the distal ends of the support members, the attachment member being adapted to engage a portion of the camping lantern so as to secure the oven attachment to the camping lantern and thereby form the camping lantern and oven assembly.

12. An oven attachment as recited in claim 11 wherein the first damper member is secured to a lower surface of the floor member.

13. An oven attachment as recited in claim 11 wherein the closure member has a handle extending therefrom for rotating the closure member about its axis of rotation.

14. An oven attachment as recited in claim 11 wherein the second damper member has a handle extending therefrom for rotating the second damper member relative to the first damper member and about the central axis of the housing.

15. An oven attachment as recited in claim 11 wherein the securing means comprises a centrally-disposed fastener which extends through the ceiling formed by the closure member so as to secure the removable roof to the closure member.

16. An oven attachment as recited in claim 11 wherein the housing has a lower portion which forms a duct for directing heat through the plurality of holes in the first and second damper members and into the oven compartment.

17. A camping lantern having a removable roof and an oven attachment which is configured to be secured between the removable roof and the body of the camping lantern so as to form an integral member of the camping lantern, the oven attachment comprising:

a cylindrical housing forming an oven compartment, the housing having a peripheral opening formed therein, the housing having a lower portion which forms a duct for directing heat into the oven compartment, the housing defining a central axis of the oven attachment;

a cylindrical closure member received in the housing, the closure member being rotatable so as to selectively permit access to the oven compartment through the peripheral opening in the housing, and to selectively close the peripheral opening so as to enclose the oven compartment;

a damper assembly disposed beneath the floor member so as to form a cavity therebetween, the damper assembly comprising a first damper member overlaying a second damper member, the first and second damper members each having a plurality of holes formed therein, wherein the flow of hot gases from the camping lantern into the oven compartment is regulated by the degree to which the plurality of holes in the first damper member is aligned with the plurality of holes in the second damper member;

support members extending downwardly from the housing, the support members being secured to the camping lantern so as to secure the oven attachment to a portion of the camping lantern and thereby form a camping lantern and oven assembly, the support members engaging a chimney portion of the camping lantern so as to secure the chimney portion to the lantern; and a centrally-disposed fastener which extends from the closure member and secures the removable roof to the closure member.

18. An oven attachment as recited in claim 17 further comprising a floor member disposed within the housing so as to form a floor of the oven compartment, the floor member having a central opening formed therein so as to receive hot gases from the damper assembly.

19. An oven attachment as recited in claim 18 wherein the first damper member comprises an annular rim formed at the periphery of a disk-shaped base, the annular rim abutting the floor member within the housing, the plurality of holes being formed in the base of the first damper member, and wherein the second damper member is disk-shaped and has a handle extending therefrom for rotating the second damper member relative to the first damper member and about the central axis of the housing.

20. An oven attachment as recited in claim 17 wherein the closure member forms a ceiling for the oven compartment, the closure member having a handle extending therefrom for rotating the closure member about an axis of rotation which substantially coincides with the central axis defined by the housing.

* * * * *